Oct. 11, 1960  H. WALKLING  2,955,358
PRECISION GAUGE FOR CYLINDRICAL WORK PIECES
Filed May 25, 1959

United States Patent Office 2,955,358
Patented Oct. 11, 1960

2,955,358
PRECISION GAUGE FOR CYLINDRICAL WORK PIECES

Helmut Walkling, Aachen, Germany, assignor to Schumag Schumacher Metallwerke G.m.b.H., Aachen, Germany, a corporation of Germany Filed May 25, 1959, Ser. No. 815,746
Claims priority, application Germany May 23, 1958
5 Claims. (Cl. 33—143)

My invention relates to a precision device for continuously gauging the diameter of axially moving cylindrical workpieces which, while being gauged, pass between two opposite contact faces of respective gauge members of which one forms a movable measuring feeler whereas the other serves as a fixed abutment for the workpieces.

When applying such a contact gauge, considerable difficulties are encountered in accurately gauging workpieces which travel through the gauging device as they emerge from a machine tool, for instance a centerless grinding machine. To overcome these difficulties, it has been proposed to constrainedly guide the workpieces as they leave the machine tool, so as to eliminate or minimize any transverse movement. This, however, is not satisfactory because the workpiece, after passing through such a guide, still tends to move laterally due to rotation of the workpiece about its axis causing deviations from the correct axial alignment. Such transverse movements falsify the gauging results because the gauging device cannot adapt itself to the momentary position of the workpiece without giving rise to forces detrimental to the precision of measurement.

It is an object of my invention to obviate such deficiencies.

To this end, and according to the invention, I mount the fixed gauging member and the movable gauging member in a horseshoe-shaped yoke or frame suspended in a holder structure from at least three approximately equiangularly disposed elastic means of appropriate spring power to permit the yoke to yield to lateral movements of the workpiece without actuating the movable contact feeler.

According to another feature of my invention, the yoke has its center of gravity located at a distance from the gauging axis, i.e. spacing axis of the two contact faces, in a direction perpendicular to that axis; and the yoke is yieldingly suspended on the holder structure for universal deflection in the gauging plane including said axis and extending transverse to the travel path of the workpiece through the gauge. Furthermore, the biasing force acting upon the displaceable gauge member to hold it in contact with the workpiece is larger in the direction of said axis than the restoring force of the elastic suspension in the same direction.

According to another feature of my invention, the contact faces are given the shape of sections of cylindrical surfaces with their convexities facing each other on the above-mentioned gauging axis.

According to a further feature of my invention, a rapid setting of the device to a given workpiece diameter is afforded by rotatably mounting a threaded bushing in the yoke for adjusting the normal spacing of the displaceable gauging member from the fixed gauging member.

According to still another feature of the invention, the gauge members are protected from damage, especially as a result of workpieces tending to whip, by providing the device on the entering side of the workpiece with two guide plates inclined toward each other, one of the guide plates being fixed and the other adjustably mounted on the yoke.

For further describing the invention, reference is made to the accompanying drawings which illustrate, diagrammatically and by way of example, one embodiment thereof and in which—

Figure 1:
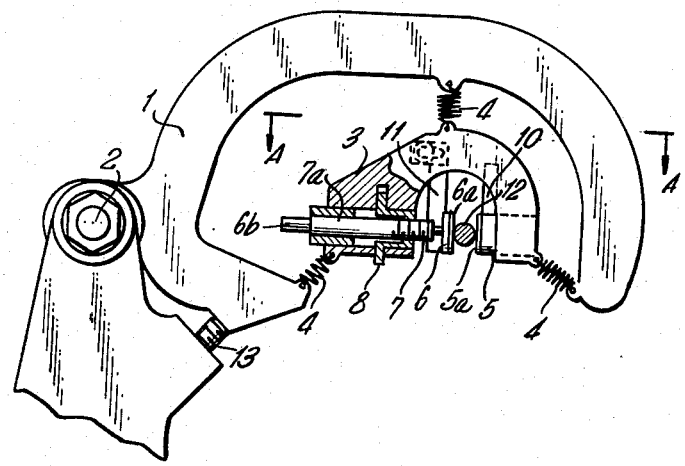
Fig. 1 is a partly sectional front view of the gauging device.
Figure 2:
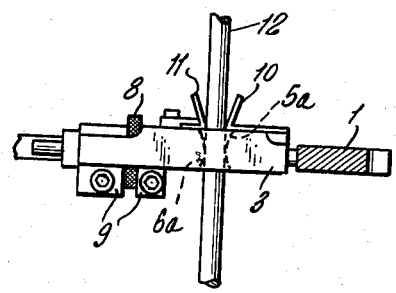
Fig. 2 is a section taken on the line A—A in Fig. 1.

A horseshoe-shaped yoke 3 is suspended by three springs 4 arranged at angular intervals of 120° in an arched, stirrup-shaped member 1 which is pivotally deflectable about a pin 2 in the machine frame and held by a stop pin 13. The springs are designed to yield to any lateral movement of the workpiece so that no relative movement of the gauge members is caused thereby. A threaded bushing 8 rotatably mounted in the yoke is in threaded engagement with a pneumatic gauging member 7 and can be turned about its axis to axially adjust the member 7. The gauge member 7 has a shaft portion 7a guided in the yoke. After the gauging member 7 is adjusted to a desired workpiece diameter with the aid of a limit gauge, it is secured in position by the tightening of clamping screws 9.

Slidably disposed within a central bore of gauging member 7 is a piston (not shown) having a piston shaft 6b joined to a feeler member 6 which has a contact face 6a shaped as a cylindrical surface extending perpendicularly to the median plane of the workpiece 12 and making contact with the workpiece. On the other side of the workpiece, it is in contact with the face 5a of a gauging member 5 which serves as an abutment and is fixed to the yoke 3. Both contact faces have the same cylindrical shape and are arranged in mirror symmetry to the workpiece. The fact that the gauging member 7 is guided in yoke 3 ensures perpendicularity of the contact faces in relation to the horizontal median axis of the workpiece when the gauging member 7 is axially moved. Any axial displacement of the feeler member 6 is opposed by a pneumatic action in the shaft 7a which forms a cylinder for the above-mentioned piston, and such displacement is indicated by an instrument (not shown).

In a gauge device as described, the workpiece 12 is free to move between the contact faces 5a, 6a upward or downward without moving the gauging members or the yoke. The elastic suspension permits the yoke to yield to any other transverse movements of the workpiece without impairing the precision of measurement.

To protect the gauging members, if the workpiece should whip, two guide plates 10, 11 are provided on the entering side of the yoke 3. Plate 10 is fixed, whereas plate 11 is laterally displaceable for adjustment. The plates 10 and 11 are inclined relative to each other and form between each other a gap widening in the direction away from the yoke.

It is preferable to design the device, as regards the mass distribution of the yoke with the parts mounted thereon, so that the yoke, in the event of lateral deflection of the workpiece from its normal path, can turn about a free axis which approximately corresponds to the gravity axis, this being the case in the illustrated embodiment. As a result, a minimum of inertia forces must be overcome by any such lateral workpiece deflection, thus securing a rapid entrainment of the yoke and a minimum of forces tending to dislocate the movable feeler member from the workpiece.

Among the further advantages of a gauging device according to the invention is the fact that it permits accurate gauging of smallest workpiece diameters.

I claim:
1. A device for gauging the diameter of axially moving cylindrical workpieces, comprising a holder structure fixed when the device is in use, a generally horseshoe-shaped yoke, at least three elastic elements by means of which said yoke is yieldingly suspended on said structure, said elastic elements being angularly spaced from each other approximately equal amounts, a fixed gauge member and an axially displaceable gauge member mounted on said yoke in axial alignment with each other and having respective contact faces opposite each other and forming an intermediate gauging space for passage of the workpiece therethrough, said elastic elements having respective spring forces such as to enable said yoke to deflect due to lateral displacement of the workpiece without displacement of said displaceable gauge member relative to said fixed gauge member.

2. A device for gauging the diameter of axially moving cylindrical workpieces, comprising a holder structure fixed when the device is in use, a yoke having two gauging members mounted thereon and axially aligned with each other, one of said gauge members being fixed and the other being axially displaceable relative to said yoke, said two gauge members having respective contact faces opposite each other and forming an intermediate gauging space for passage of the workpiece therethrough, elastic suspension means connecting said yoke with said holder structure whereby said yoke is capable of universal motion in the gauging plane and relative to said structure, said yoke having a center of gravity located at a distance from said contact faces measured perpendicularly to the gauging direction, said displaceable gauge member having an elastic biasing force in said gauging direction tending to maintain said two contact faces in contact engagement with the workpiece, and said elastic suspension means having in said gauging direction a restoring force smaller than said biasing force.

3. A gauging device according to claim 2, each of said two contact faces forming a section of a cylindrical surface and being convex relative to the other contact face in said gauging direction.

4. A gauging device according to claim 2, comprising a bushing rotatably mounted in said yoke, said displaceable gauging member having a hollow cylindrical portion and a feeler member axially displaceable in said cylindrical portion, said cylindrical portion being coaxially surrounded by said bushing and in threaded engagement therewith, whereby rotation of said bushing can adjust the gauging device to the normal diameter of the workpieces to be gauged.

5. A gauging device according to claim 2, comprising two guide members mounted on said yoke and inclined toward each other so as to form a gap widening in the direction away from said yoke, said guide members being located at opposite sides of the workpiece entering path of the device, one of said guide members being fixed and the other being adjustable laterally with respect to said path.

References Cited in the file of this patent

UNITED STATES PATENTS

| | | |
|---|---|---|
| 2,344,595 | Calow et al. | Mar. 21, 1944 |
| 2,357,143 | Smith | Aug. 29, 1944 |
| 2,367,797 | Rappl | Jan. 23, 1945 |
| 2,571,917 | Mennesson | Oct. 16, 1951 |